(12) United States Patent
Gilges et al.

(10) Patent No.: US 10,927,938 B2
(45) Date of Patent: Feb. 23, 2021

(54) STRAIN WAVE GEAR REQUIRING REDUCED RADIAL INSTALLATION SPACE

(71) Applicant: OVALO GmbH, Limburg (DE)

(72) Inventors: Siegmar Gilges, Bad Schwalbach (DE); Matthias Glad, Aarbergen-Michelbach (DE)

(73) Assignee: OVALO GmbH, Limburg (DE)

( * ) Notice: Subject to any disclaimer, the term of this patent is extended or adjusted under 35 U.S.C. 154(b) by 470 days.

(21) Appl. No.: 15/735,234

(22) PCT Filed: Jun. 10, 2016

(86) PCT No.: PCT/EP2016/063401
§ 371 (c)(1),
(2) Date: Dec. 11, 2017

(87) PCT Pub. No.: WO2016/198673
PCT Pub. Date: Dec. 15, 2016

(65) Prior Publication Data
US 2018/0180154 A1    Jun. 28, 2018

(30) Foreign Application Priority Data

Jun. 12, 2015    (DE) .................... 10 2015 109 426.6
Jun. 19, 2015    (LU) ......................................... 92750

(51) Int. Cl.
*B62D 5/00* (2006.01)
*F16H 49/00* (2006.01)
(Continued)

(52) U.S. Cl.
CPC ........... *F16H 49/001* (2013.01); *B62D 5/008* (2013.01); *F16C 33/581* (2013.01);
(Continued)

(58) Field of Classification Search
CPC .... F16H 49/001; F16H 55/0833; F16H 55/17; F16H 2049/003; F16H 2055/176;
(Continued)

(56) References Cited

U.S. PATENT DOCUMENTS 2,943,508 A     7/1960  Walton
4,848,184 A *   7/1989  Ulbing ................ F16H 25/2409
                                                 74/640

(Continued)

FOREIGN PATENT DOCUMENTS

DE    112004002092 T5    9/2006
DE    102007000945 A1    3/2009
(Continued)

OTHER PUBLICATIONS

Bamnote, et al., Meshing Analysis of Teeth of Harmonic Drives: A Computer Based Approach, Dept. of Mechanical Engg., Y.C. College of Engg., Nagpur., New Delhi, Retrieved From Internet: http://www.nacomm03.ammindia.org/Articles/Ana011.pdf Dec. 18, 2003.

*Primary Examiner* — Kevin Hurley
*Assistant Examiner* — Marlon A Arce
(74) *Attorney, Agent, or Firm* — Hodgson Russ LLP

(57) ABSTRACT

The invention relates to a strain wave gear, having an outer ring with an inner toothing, with which a flexible inner ring with an outer toothing engages at two opposing points. The strain wave gear is characterized in that the ratio of the pitch diameter of the outer ring to the rim thickness of the outer ring lies in the region of 13 to 21, especially in the region of 17 to 19, especially at 17.587, wherein the teeth of the toothing of the inner ring have a profile angle in the region of 8 degrees to 15 degrees or in the region of 11 degrees to 12 degrees or one of 11.615 degrees, and/or wherein the teeth of the toothing of the outer ring have a profile angle in
(Continued)

Figure 1:
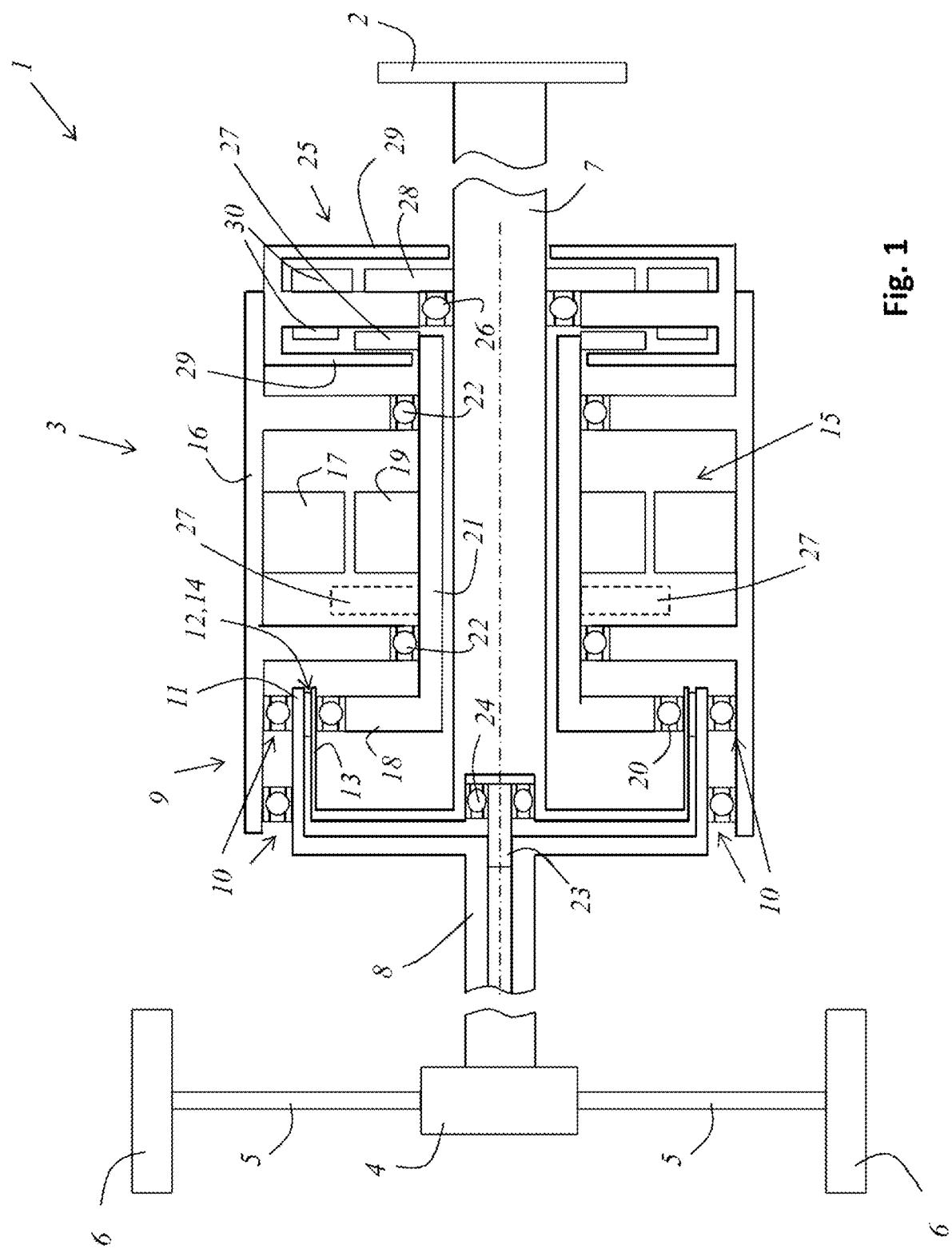

the region of 8 degrees to 15 degrees or in the region of 11 degrees to 13 degrees or one of 12.474 degrees.

34 Claims, 7 Drawing Sheets

(51) Int. Cl.
*F16C 33/58* (2006.01)
*F16H 55/08* (2006.01)
*F16H 55/17* (2006.01)
*F16C 19/50* (2006.01)
*F16C 19/06* (2006.01)

(52) U.S. Cl.
CPC ......... *F16H 55/0833* (2013.01); *F16H 55/17* (2013.01); *F16C 19/06* (2013.01); *F16C 19/50* (2013.01); *F16H 2049/003* (2013.01); *F16H 2055/176* (2013.01)

(58) Field of Classification Search
CPC ........ F16C 33/581; F16C 19/50; F16C 19/06; B62D 5/008
See application file for complete search history.

(56) References Cited

U.S. PATENT DOCUMENTS

| | | | | |
|---|---|---|---|---|
| 4,974,470 | A * | 12/1990 | Ishikawa | ............... F16H 49/001 |
| | | | | 74/640 |
| 7,819,385 | B2 * | 10/2010 | Hunter | .................. F16K 3/0254 |
| | | | | 251/264 |
| 2007/0022838 | A1 | 2/2007 | Ishikawa | |
| 2010/0175503 | A1 | 7/2010 | Zhang et al. | |
| 2012/0085188 | A1 | 4/2012 | Kurogi | |

FOREIGN PATENT DOCUMENTS

| | | |
|---|---|---|
| DE | 102007051418 A1 | 4/2009 |
| DE | 102010037226 A1 | 1/2012 |
| DE | 102011109170 A1 | 2/2013 |
| DE | 102011053323 A1 | 3/2013 |
| DE | 112011104783 T5 | 12/2013 |
| DE | 112012005619 T5 | 10/2014 |
| DE | 102013225956 A1 | 6/2015 |
| DE | 102013225960 A1 | 6/2015 |
| EP | 0640778 A1 | 3/1995 |
| EP | 2003368 A2 | 12/2008 |
| KR | 10-2013-0030041 A | 3/2013 |
| WO | 2008068207 A1 | 6/2008 |

* cited by examiner

STRAIN WAVE GEAR REQUIRING REDUCED RADIAL INSTALLATION SPACE

CROSS-REFERENCE TO RELATED APPLICATIONS

The present application is the U.S. national phase of International Application No. PCT/EP2016/063401 filed Jun. 10, 2016, which claims priority of German Application No. 10 2015 109 426.6 filed Jun. 12, 2015 and Luxembourgian Application No. 92750 filed Jun. 19, 2015, the entire disclosures of which are incorporated herein by reference.

FIELD OF THE INVENTION

The invention relates to a strain wave gear, having an outer ring with an inner toothing, with which a flexible inner ring with an outer toothing engages at two opposing points.

The invention furthermore relates to an actuator, which may be designed in particular as a superimposition actuator for a vehicle steering system or an active chassis and which comprises a strain wave gear of the mentioned kind.

The invention in particular relates as well to a vehicle steering and an active chassis, as well as a motor vehicle.

The invention furthermore relates to a motorized linkage for the connecting of two carriers of a programmable automated movement device able to move relative to each other, as well as a programmable automated movement device.

BACKGROUND OF THE INVENTION

Strain wave gears are readily used on account of their benefits, such as their natural freedom from play, for example as a superimposition actuator in vehicle steering systems. Strain wave gears are also used for example in flight simulators or in machine tools.

A superimposed steering has the advantage that an additional steering movement can be superimposed on the steering movements which the driver dictates by turning the steering wheel, depending on the driving situation. For example, a superimposed steering may be designed so that, during slow driving, such as when maneuvering or parking, a large steering angle can be achieved with smaller angles of turning of the steering wheel, while the superimposed steering works the other way during fast driving, such as on the freeway.

From DE 10 2007 051 418 A1 there is known a gearing for a vehicle steering system. The gearing serves to superimpose additional steering movements on the steering movements produced by a driver. The gearing has an input shaft, which is connected firm against rotation to a flexspline. Furthermore, the gearing has an output shaft, which is connected firm against rotation to a circular spline. The flexspline is provided with an outer toothing, which engages with an inner toothing of the circular spline. Within the flexspline is arranged a wave generator driven by an electric motor.

There is also known from DE 10 2007 000 945 A1 a superimposition actuator for a steering system of a vehicle. The superimposition actuator has a superposition gear with a first gearing input shaft and a second gearing input shaft for superimposing the rotary angles occurring on the two gearing input shafts onto a gearing output shaft of the superposition gear, wherein the first gearing input shaft is in operative connection with a steering handle. The second gearing input shaft is in operative connection to an electronically commutated servomotor.

From DE 10 2011 109 170 A1 there is known a steering system having a steering handle and a superimposition actuator. The superimposition actuator is regulated in dependence on an actual steering handle angle. The steering system is characterized in that a regulating device is provided, which initiates a locking of the superimposition actuator when a control deviation value passes beyond an upper tolerance value and/or when a control deviation value passes below a lower tolerance value. Different tolerance values are assigned to different driving or steering situations.

From DE 10 2011 053 323 A1 there is known a wave gearing for a steering system of a vehicle, with a radial-flexible roller bearing having an inner ring, which is fitted onto an outer circumferential surface of an eccentric drive core of the wave gearing, and an outer ring, which acts on an inner circumferential surface of a radial-flexible roller bushing, and roller bodies held radially between the inner ring and the outer ring. A sealing device seals off the radial-flexible roller bearing from the outside. The sealing device has at least one sealing disk, which is connected firm against rotation to the eccentric drive core.

SUMMARY OF THE INVENTION

The problem which the present invention proposes to solve is to indicate a strain wave gear in which the ratio of transmissible torque and radial design size is especially large.

The problem is solved by a strain wave gear, which is characterized in that the ratio of the pitch diameter of the outer ring to the rim thickness of the outer ring lies in the region of 13 to 21, especially in the region of 17 to 19, especially at 17.587, and a. the teeth of the toothing of the inner ring have a profile angle in the region of 8 degrees to 12 degrees or in the region of 9 degrees to 11 degrees or one of 11.615 degrees, and/or b. the teeth of the toothing of the outer ring have a profile angle in the region of 8 degrees to 14 degrees or in the region of 9 degrees to 13 degrees or one of 12.474 degrees.

According to the invention it was recognized that the commonly adopted view that the outer ring of a strain wave gear must be designed as rigid as possible and therefore very large radially is not necessarily always correct. In fact, an outer ring with a significantly reduced rim thickness is in particular less radially rigid, which may cause significant problems in the operation of the strain wave gear. And in particular all the more as the torques being transmitted are larger. For example, the result may be a ratcheting, a jamming, increased wear and/or tooth tip collisions.

According to the invention, however, it was recognized that these problems can be avoided by a special configuration of the toothing. An important aspect here is an especially rigid profile angle. This is especially the case also in connection with an appropriately adapted tooth height, as shall be explained in further detail below. Furthermore, it was recognized that the toothing can be configured such that the rim thickness can be reduced even by a factor of four as compared to conventional strain wave gears without the above-mentioned problems occurring and without the outer ring radially needing additional stabilization.

The recognition by the invention that an especially good ratio of transmissible torque and radial design size is achievable by a special combination of a reduced rim thickness and a particular configuration of the toothing, without the above described problems occurring, is entirely general and can be implemented without regard to the material of the outer ring. Thus, for example, a strain wave gear of the prior art, whose outer ring consists of a certain material, can be replaced according to the invention by a radially smaller strain wave gear whose outer ring consists of the same material with the same loading capacity in regard to the torque being transmitted. Alternatively, the strain wave gear of the prior art whose outer ring consists of a certain material could also be replaced by a strain wave gear according to the invention with an outer ring of the same material, having the same radial dimensions, but able to transmit larger torques than the strain wave gear of the prior art.

Of special advantage and in particular having a very compact construction is one embodiment of the strain wave gear in which the outer ring contains iron and/or consists of steel. In particular, the outer ring may advantageously be made of austenitic steel or ferritic steel. It is also possible for the outer ring to be made of titanium or to contain titanium. In particular, it may advantageously be provided that the outer ring contains one of the following elements or contains a combination of the following elements: chromium, cobalt, manganese, nickel, silicon, tungsten, aluminum, beryllium, lead, copper, molybdenum, niobium, tantalum, titanium, vanadium, zirconium, cerium, carbon, phosphorus, sulfur, nitrogen, boron.

In a special embodiment of the strain wave gear, the number of teeth of the outer toothing of the flexible inner ring is between 154 and 164 teeth or amounts to precisely 160 teeth, while the inner toothing of the outer ring has precisely two more teeth than the outer toothing of the flexible inner ring.

In one special embodiment of the strain wave gear, the outer toothing and the inner toothing each have the same modulus adapted to each other, namely, a modulus in the region of 0.4 mm to 0.7 mm or in the region of 0.5 mm to 0.6 mm or in the region of 0.55 mm to 0.57 mm or of 0.56875 mm. Such a strain wave gear and in particular also a superimposition actuator consisting of this strain wave gear and the motor can be designed especially compact and space-saving.

In particular it may be provided that the outer toothing of the inner ring has a pitch diameter in the region of 90 mm to 92 mm or in the region of 90.5 mm to 91.5 mm or of 91.0 mm, and/or the inner toothing of the outer ring has a pitch diameter in the region of 91 mm to 93 mm or in the region of 91.8 mm to 92.3 mm or of 92.1375 mm. The pitch diameter is defined as the product of the number of teeth and the modulus.

In an especially reliable, robust, yet quiet-running design, the strain wave gear has a deflection in the region of 1.1 mm to 1.3 mm or in the region of 1.18 mm to 1.22 mm or one of 1.20 mm. By deflection is meant the radial travel of a tooth of the outer toothing of the inner ring upon switching between low and high axis.

Figure 2:
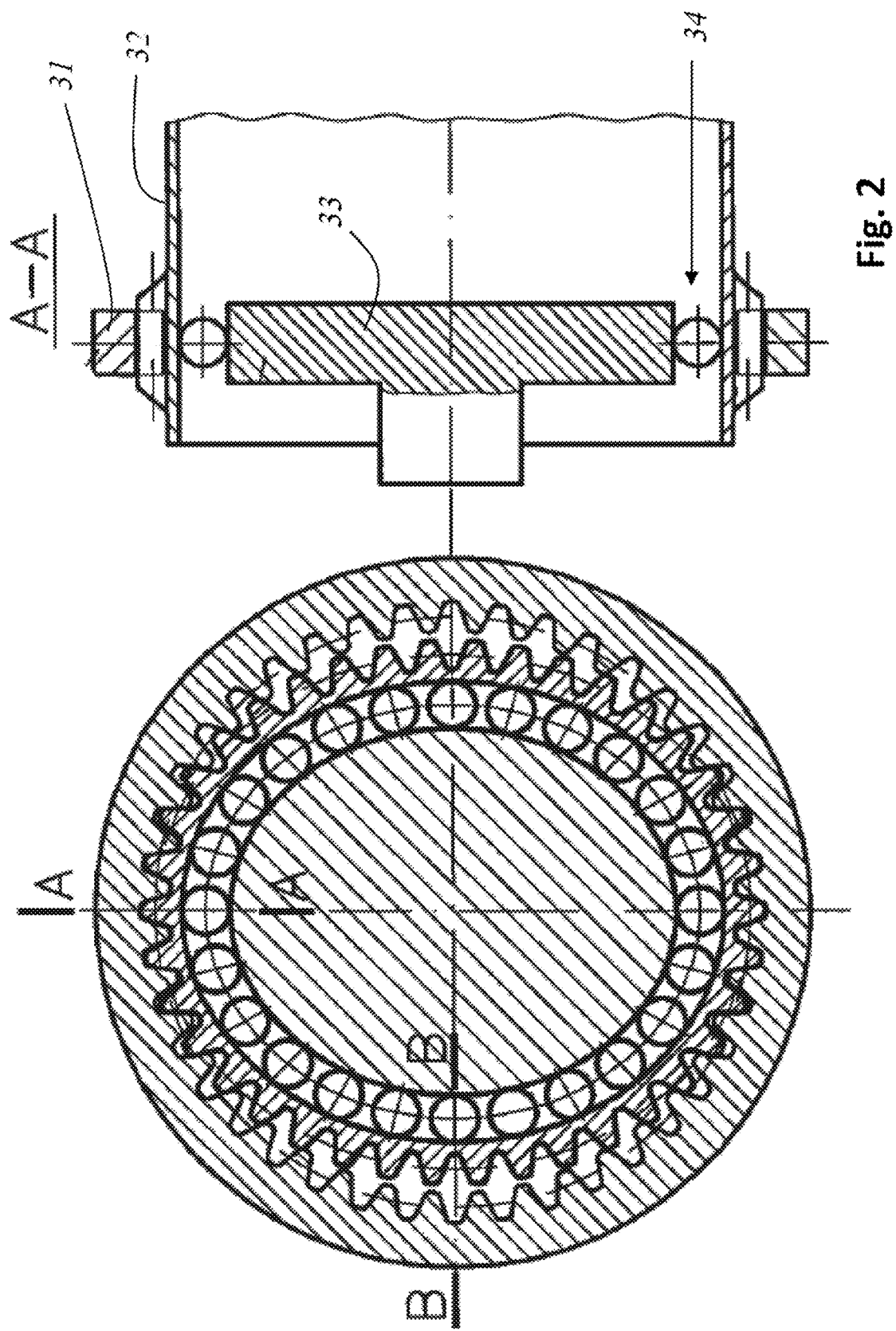
Figure 3:
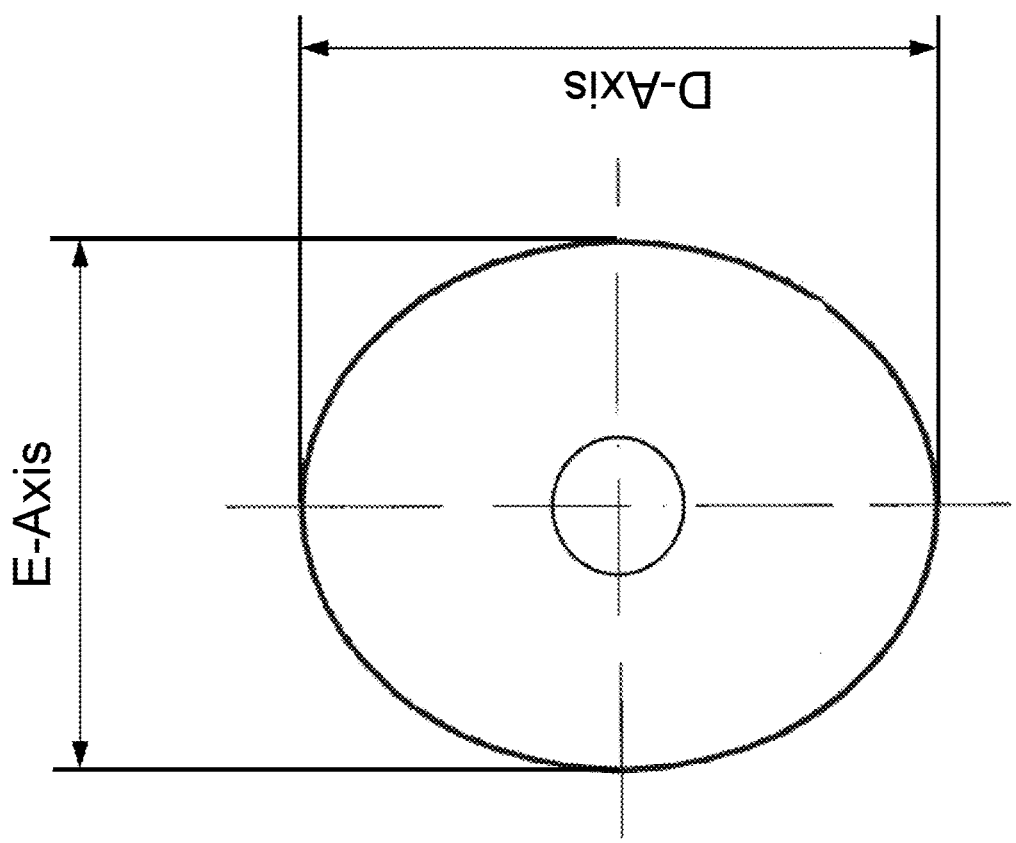

FIG. 2 illustrates schematically the construction of a strain wave gear having among other things an outer ring 31, an inner ring 32, a wave generator 33 and a ball bearing 34. FIG. 3 illustrates schematically the high axis D of the inner ring and the low axis E of the inner ring. The deflection is computed as (D−E)/2.

Figure 4:
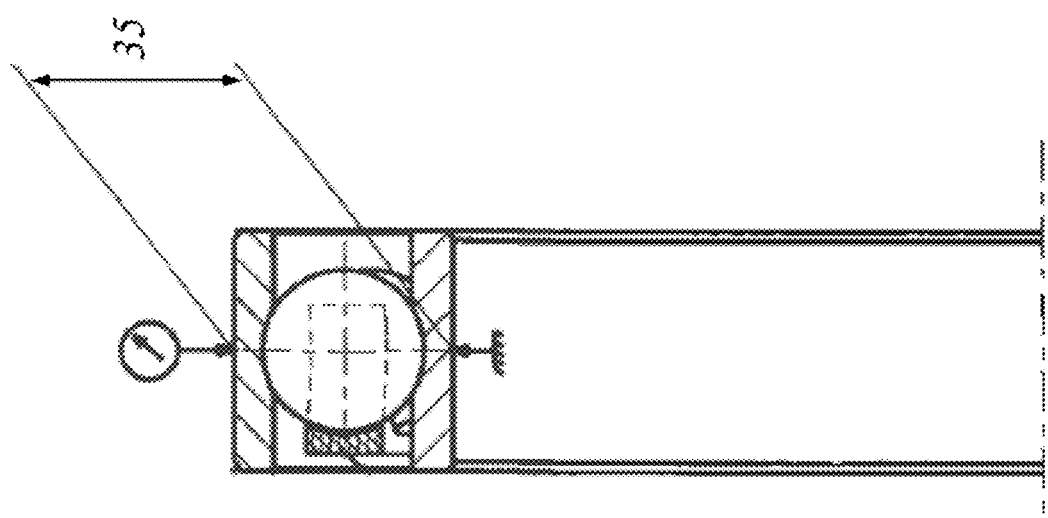

In one special embodiment it is provided that the strain wave gear comprises a wave generator, which is mounted rotatably in the inner ring by means of a bearing. Advantageously, the bearing may have a cross section height in the region of 11 mm to 13 mm or in the region of 12.1 mm to 12.4 mm or one of 12.26 mm. A bearing with such a cross section height is especially long-lasting yet still quiet in operation for the special application in a vehicle steering. This can be accomplished in particular, as is shown in greater detail below, in that the dimensioning of the bearing is especially adapted to the aforementioned deflection. By the cross section height 35 is meant the no-play radial distance between the surfaces of the bearing races facing away from the roller bodies, as is illustrated in FIG. 4.

In one special embodiment, the roller bodies of the bearing, which may especially be designed as balls, have a roller body diameter in the region of 8.5 mm to 8.9 mm or in the region of 8.7 mm to 8.8 mm or one of 8.731 mm.

In particular, it may advantageously be provided that the quantity of the strain wave gear which is computed from (deflection/cross section height) lies in the region of 0.08 to 0.12 or lies in the region of 0.09 to 0.11 or the strain wave gear obeys the relation: (deflection/cross section height) =0.0979.

In an especially low-wearing embodiment it is provided that the quantity of the strain wave gear which is computed from (deflection/cross section height)×roller body diameter ("/"=division; "×"=multiplication)

lies in the region of 0.7 to 1.0 or lies in the region of 0.8 to 0.9 or the strain wave gear obeys the relation: (deflection/ cross section height)×roller body diameter=0.855. Namely, with such a design, it is guaranteed that the outer bearing race, which experiences continuous and periodic deformation in operation corresponding to the deflection, does not become prematurely fatigued. Furthermore, it is assured that the Hertzian pressure of the roller bodies against the surface of the running tracks of the bearing races is small enough to prevent damage such as grain staining or pitting in the long term.

The strain wave gear may be designed advantageously such that the ratio of the deflection and the pitch diameter of the inner ring lies in the region of 0.008 to 0.018 or lies in the region of 0.01 to 0.016 or the ratio of the deflection and the pitch diameter of the inner ring amounts to 0.0132.

Figure 5:
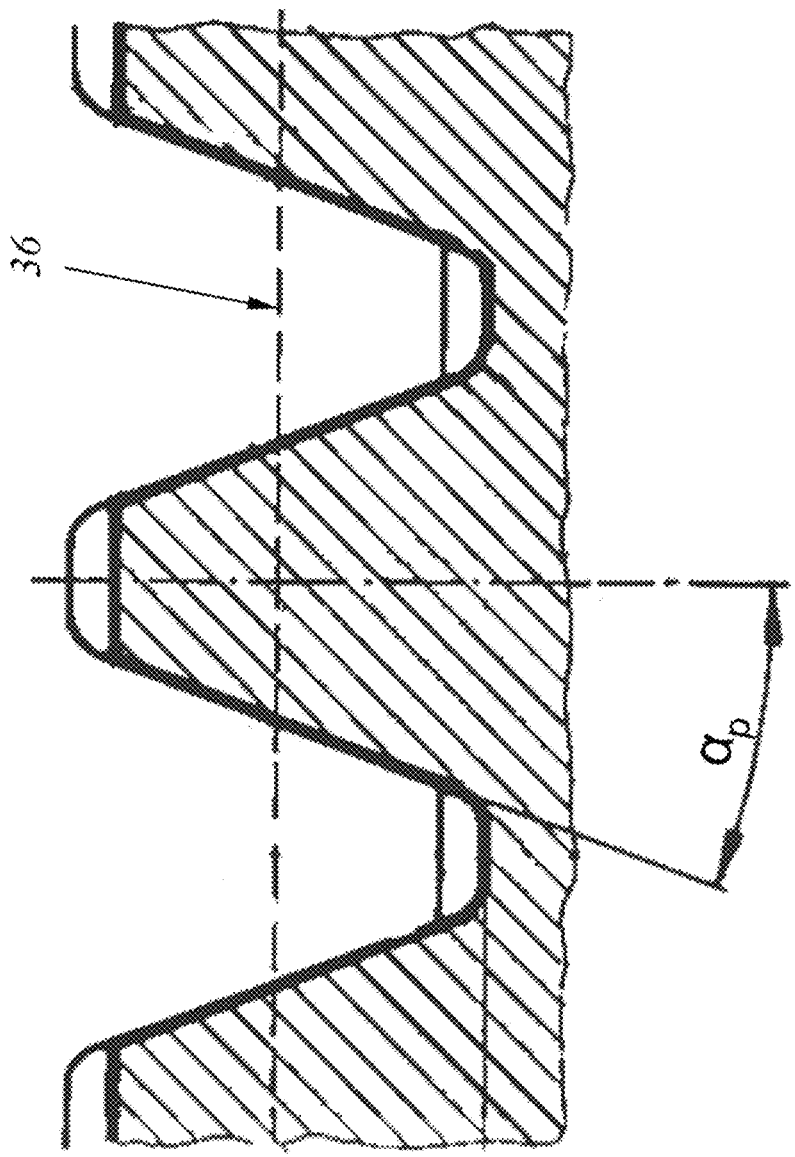

In likewise advantageous manner it may be provided that the teeth of the toothing of the inner ring have a profile angle in the region of 8 degrees to 15 degrees or in the region of 11 degrees to 12 degrees or one of 11.615 degrees, and/or the teeth of the toothing of the outer ring have a profile angle in the region of 8 degrees to 15 degrees or in the region of 11 degrees to 13 degrees or one of 12.474 degrees. The profile angle $\alpha_p$ is, as illustrated in FIG. 5, the angle of the flank relative to the center of the tooth on the reference profile. The dashed line is the profile reference line 36. The reference profile is a generally valid profile, regardless of the modulus of the particular toothing, which is used to define a toothing. The reference profile corresponds to a gear with an infinite number of teeth. The relation of pitch diameter=modulus×number of teeth ("×" meaning multiplication) explains the circumstance that, with an infinite number of teeth, the pitch diameter likewise becomes infinite and a straight line (toothed rack) is produced.

Figure 6:
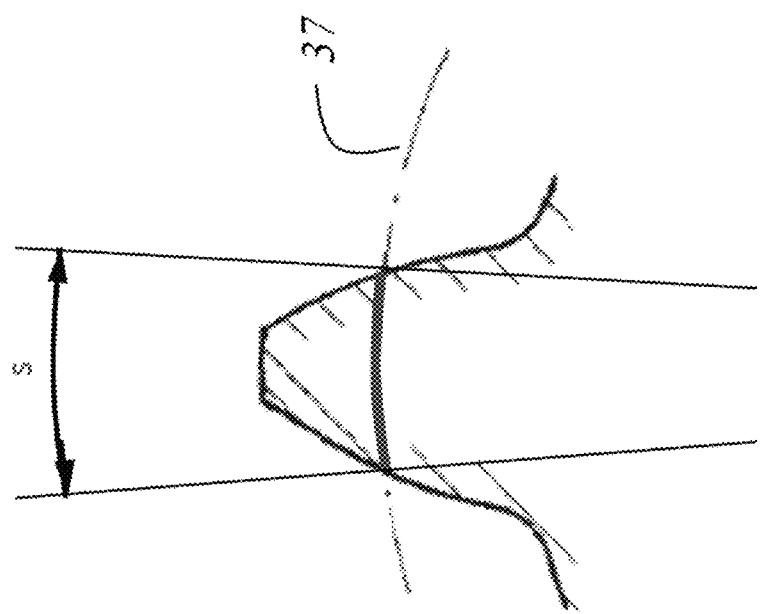

It has proven to be of special advantage for the invention when in the strain wave gear the teeth of the toothing of the inner ring have a tooth thickness on the pitch circle in the region of 0.7 mm to 0.9 mm or in the region of 0.75 mm to 0.85 mm or one of 0.8 mm, and/or when the teeth of the toothing of the outer ring have a tooth thickness in the region of 0.8 mm to 1.1 mm or in the region of 0.86 mm to 0.96 mm or one of 0.916 mm. The tooth thickness s is, as illustrated in FIG. 6, the length of an arc segment of a tooth measured on the pitch circle 37 across the profile width.

In one particular embodiment, in the strain wave gear the ratio of the deflection to the number of teeth of the inner ring lies in the region of 0.005 to 0.01 or lies in the region of 0.006 to 0.009. In particular, it may advantageously be provided that in the strain wave gear the ratio of the deflection to the number of teeth of the inner ring is 0.0075. This produces an especially large degree of coverage, which results in a significant boosting of the torque capacity. This is explained by a more homogeneous stress distribution due to the larger coverage and the lesser degree of deformation in the area of the rim of the inner gear.

In especially advantageous manner, the rim thickness of the inner ring can lie in the region of 0.9 mm to 1.3 mm or lie in the region of 1.1 mm to 1.2 mm. In particular, the rim thickness of the inner ring can advantageously be 1.128 mm. In this way, in particular the ratio of stresses in the material in the region of the rim of the gear to the pot stiffness is positively influenced.

Figure 7:
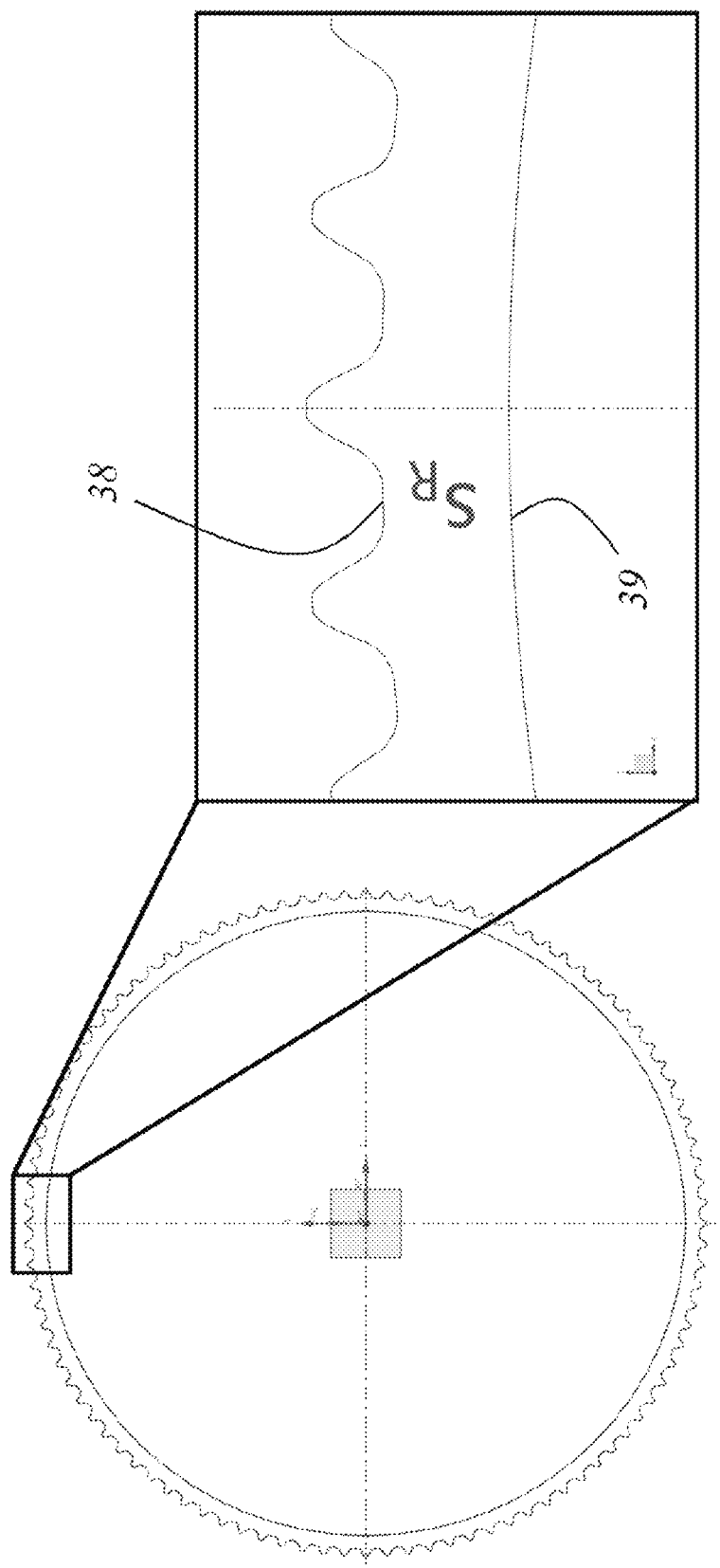

In one advantageous embodiment it is provided that in the strain wave gear the ratio of the deflection to the rim thickness of the inner ring lies in the region of 0.9 to 1.2 or lies in the region of 1.00 to 1.12 or in the strain wave gear the ratio of the deflection to the rim thickness of the inner ring is 1.06. Thanks to a suitable deflection, as described above, the degree of coverage is increased. A well balanced ratio of deflection to rim thickness generates less rim stresses than in conventional wave gearings. The rim thickness $s_R$ is, as illustrated in FIG. 7, the wall thickness between the inner surface 39 of the flexible inner ring and the tooth base 38 of the flexible inner ring and it is calculated as half the difference between the inner diameter of the inner ring and the base circle diameter of the inner ring.

In advantageous manner it may also be provided that in the strain wave gear the ratio of the deflection to the profile angle of the teeth of the inner ring lies in the region of 0.06 to 0.15 or lies in the region of 0.08 to 0.12, or in the strain wave gear the ratio of the deflection to the profile angle of the teeth of the inner ring is 0.103. At constant deflection, the tangential force component of the transmissible torque increases and the radial force decreases. In this way, it is possible to realize an especially small rim thickness of the hollow gear. Furthermore, the small profile angle has positive impact on the radial load component as well as the acoustical behavior of the gearing.

In likewise advantageous manner, it can also furthermore be provided that in the strain wave gear the ratio of the deflection to the tooth thickness of the teeth of the inner ring lies in the region of 1.1 to 1.9 or lies in the region of 1.4 to 1.6 or in the strain wave gear the ratio of the deflection to the tooth thickness of the teeth of the inner ring is 1.50.

In an especially advantageous embodiment of the strain wave gear the evolvent portion of the toothing length of the inner ring lies in the region of 15% to 40% or lies in the region of 20% to 30%. In particular, it may be advantageously provided that the evolvent portion of the toothing length of the inner ring amounts to 24%. Alternatively or additionally, it may also be provided that the evolvent portion of the toothing length of the outer ring lies in the region of 19% to 39% or lies in the region of 24% to 34% or amounts to 29%. A design of the toothings of inner ring and outer ring with the mentioned evolvent portions has the special advantage of a small rolling component and a larger sliding component, which has especially advantageous impact on the noise development. The evolvent portion of the toothing length is the portion characterized in that the section of the toothing is equal to an evolvent originating at the base circle.

The teeth of the inner ring may have a front and/or rear relief. This accomplishes an improved tooth engagement. Alternatively or additionally, it may also be provided that the variation of the tooth tip height across the tooth width is a convex curve.

In one special design, it is provided that the tooth tip and the tooth base run in parallel.

It may also be advantageously provided, especially to avoid tooth tip collisions and reduce acoustic excitation, that the variation of the tooth tip height of the inner ring along the tooth width of at least one tooth, preferably of each tooth, has no linear component parallel to the center axis at least in one tooth engaging region. In this regard, it has been recognized that the conventional tooth geometry on the flexible inner ring, having a symmetrical cross section curve with a front and a rear relief and usually a cylindrical tooth component, necessitates a flank contact region in the front region of the toothing (facing away from the flex pot base). Upon change in the torque being transmitted, this flank contact region shifts, due to the radial component of the tooth forces, to the cylindrical portion (variation of the tooth tip height along the tooth width parallel to the center axis) of the toothing. Due to this circumstance, the flank contact region is moved further toward the middle of the toothing. This is accompanied by a highly progressive increase in rigidity, which has direct impact on the flank pressure of the inner ring toothing with the toothing of the outer ring. It has been recognized that this flank pressure in particular and the pointlike flank contact region may result in the excitation of a vibration which has negative impact on the acoustical behavior of the overall system.

In one advantageous embodiment, the cylindrical portion of the toothing of the flexible inner ring is eliminated entirely. In particular, this may be advantageously accomplished, for example, in that a variation of the tooth tip height along the tooth width—at least in the tooth engagement region—is chosen which can be described by a polynomial of n-th order, where n is greater than 1.

In one particular embodiment it is provided that the variation of the tooth tip height of the inner ring along the tooth width of at least one tooth, preferably of every tooth, at least in one tooth engagement region is free of a linear component and/or the variation of the tooth tip height along the tooth width of at least one tooth, preferably of every tooth, at least in one tooth engagement region has at least one nonlinear section and/or the variation of the tooth tip height along the tooth width of at least one tooth, preferably of every tooth, at least in one tooth engagement region is asymmetrical.

By reduction or total avoidance of the linear components of the variation of the tooth tip height along the tooth width, especially by eliminating the cylindrical component, the variation in rigidity no longer has the above described very progressive variation. In particular, the flank contact region is increased along the engagement axis. Moreover, according to the invention, this reduces the radial sliding component of the flanks of the flexible inner ring in relation to the toothing of the outer ring, which reduces the excitation of vibrations due to possible irregularities of the flank topology.

In one special embodiment, the variation of the tooth tip height of the inner ring along the tooth width is constant in the mathematical sense. In particular, as already mentioned above, it may be advantageously provided that the variation of the tooth tip height along the tooth width can be described by a polynomial of n-th order, where n is greater than 1 and/or the variation of the tooth tip height along the tooth width for a portion can be described by a polynomial of n-th order, where n is greater than 1.

In one special embodiment, it is provided that the variation of the tooth tip height along the tooth width decreases constantly down to a tooth tip height of zero and/or the gearing component is configured as a pot-shaped inner ring and the tooth tip height decreases constantly in the direction of the pot bottom down to a tooth tip height of zero.

Thanks to the described possible variations of the tooth tip height according to the invention, especially the decreasing of the tooth tip height directed partly toward the pot bottom, which can preferably be described by a polynomial of order higher than 1, it is additionally possible to transmit especially large torques without any ratcheting occurring. In brief; such a design has a large ratcheting torque. Depending on the step-down ratio and structural size, this may be assisted in particular in that the tooth tip height decreases constantly in the direction of the pot bottom down to a tooth tip height of zero.

In one special embodiment, it is provided that each tooth base has a linear variation along the tooth base width or the variation of the tooth bases is parallel to the variation of the tooth tips. Depending on the application, however, it may also be provided that the tooth base variation has a different configuration.

In one special embodiment, it is provided that the variation of the tooth tip height of each tooth of the inner toothing of the outer ring along the tooth tip width is asymmetrical.

In particular, it may advantageously be provided that the variation of the tooth tip height of at least one tooth, preferably of each tooth, of the inner toothing of the outer ring along the tooth tip width at least in one tooth engagement region can be described by a polynomial of n-th order, where n is greater than 1, and/or the variation of the tooth tip height of at least one tooth, preferably of each tooth, of the inner toothing along the tooth tip width at least in one tooth engagement region for a portion can be described by a polynomial of n-th order, where n is greater than 1.

In one special embodiment, it is provided that the variation of the tooth tip height of at least one tooth of the inner toothing of the outer ring, preferably of each tooth of the inner toothing, has a rising section and a falling section, where the magnitudes of the gradient angle of the rising and falling section are different.

Especially advantageous is a design in which it is provided that the inner ring is configured as a flex pot and the variation of the tooth tip height of at least one tooth of the inner toothing, preferably each tooth of the inner toothing, has a section facing the pot bottom and a section away from the pot bottom, wherein the magnitude of the gradient angle of the section facing the pot bottom relative to an axis parallel to the center axis is larger than the magnitude of the gradient angle of the section away from the pot bottom relative to the axis parallel to the center axis. Such a design on the one hand affords benefits in regard to avoidance of a tip collision and in terms of noise reduction, but also to the maximum transmissible torque, i.e., an especially large ratcheting torque.

Alternatively or additionally, it may be provided that the variation of the tooth tip height of at least one tooth of the inner toothing, preferably of each tooth of the inner toothing, has a rising section and a falling section and between these sections it has a section which is parallel to the center axis.

Alternatively to a design in which the variation of the tooth tip height of at least one tooth of the inner toothing, preferably of each tooth of the inner toothing, rises along the tooth tip width of the inner toothing and falls again, it may be provided that the teeth of the inner toothing have only a one-sided tooth relief. Such a design has an especially large ratcheting torque (without sacrificing the benefits of avoiding a tip collision and in terms of noise reduction).

In order to achieve the above described benefits of the strain wave gear at least in part, it is also possible for the flexible inner ring to have, instead of between 154 and 166 teeth, a number of teeth in the region of 308 to 332 teeth, in particular it has precisely 320 teeth, and the outer ring has precisely four more teeth on its inner toothing than the flexible inner ring. In particular, it may be provided that the outer toothing and the inner toothing each have a modulus value which corresponds to half the modulus value as mentioned in claim 2.

Alternatively, the strain wave gear may also be designed such that the inner ring engages with the outer ring at three points instead of two points and the flexible inner ring has, instead of between 154 and 166 teeth, a number of teeth in the region of 231 to 249 teeth, in particular it has precisely 240 teeth, and the outer ring has precisely three more teeth than the flexible inner ring. It may be provided in particular that the outer toothing and the inner toothing each have a modulus value which corresponds to $\frac{2}{3}$ of the modulus values mentioned in claim 2.

As further alternatives, the strain wave gear may also be designed such that the inner ring engages with the outer ring at four points instead of two points and the outer ring has, instead of two, precisely four more teeth than the flexible inner ring. However, such a design is much more costly than a design with two engaging points, as described above.

Of special advantage is an actuator having a superposition gear, which is designed as a strain wave gear according to the invention, and a motor which drives a shaft of the strain wave gear. In particular, the actuator may be designed as a superimposition actuator for a vehicle steering, for example, which is designed to superimpose additional steering movements on the steering movements executed with a steering handle.

Preferably, the motor of the actuator is specially attuned to the above mentioned embodiments of the strain wave gear. It may be advantageously provided that more than two coils of the motor are switched to a common motor phase and/or at least one tooth of the motor is wound with at least two wires switched in parallel with each other. Such a design has the special advantage of ensuring in simple manner that the motor can produce a sufficient torque for the operating of the vehicle steering.

Advantageously it may also be provided that on at least one stator tooth, especially on all stator teeth respectively, there are present exactly 17 windings. Especially advantageous is a design in which on at least one stator tooth, there are present more than 17 windings, especially exactly 18 or 19 windings, and/or the coil cross section area in the motor per each coil tooth is greater than 1.4 $mm^2$; regardless of how many wires the coil cross section area distributes. Such a design may be advantageously configured to provide a sufficient torque.

It is furthermore especially advantageous for the rotor of the motor to have more than 4 pole pairs. Moreover, it may be provided that the length of the magnets is around 20 mm, especially 19.7 mm. Especially advantageous is a design in which the length of the magnets is more than 20 mm. Such a design may be advantageously configured to provide a sufficient torque.

Advantageously, furthermore, and independently of the above mentioned measures, it may be provided that the tip circle diameter of the magnets is around 40 mm. In particular, it may advantageously be provided that the tip circle diameter of the magnets is greater than 40 mm. It is also advantageously possible—alternatively or additionally—for the outer diameter of the rotor to lie in the region of 42 mm to 46 mm or for the outer diameter of the rotor to be 45 mm.

In one advantageous embodiment, which can be both especially compact and also especially robust in design, the motor and the strain wave gear are arranged coaxially to each other. Alternatively or additionally, it may also be provided that the motor and the strain wave gear together form a superimposition actuator and/or that the motor and the strain wave gear are arranged in a common housing. The housing may be connected in rotationally firm manner to a vehicle chassis.

In particular, it may be provided that the motor and the strain wave gear together form a superimposition actuator, having an input shaft mechanically connected to the steering handle and a drive shaft, arranged coaxially to the input shaft, which is driven by the motor and mechanically connected to a wave generator of the strain wave gear.

For the reasons mentioned above, a vehicle steering which comprises such a superimposition actuator is especially advantageous.

The strain wave gear according to the invention and/or the above described actuator can be used with special advantage in an active chassis. This enables in particular the special advantage that the strain wave gear according to the invention takes up less radial design space. In particular, the chassis may be designed as a wheel-selective chassis, in which each wheel is matched up with its own actuator.

Quite generally, the strain wave gear according to the invention and/or the above described actuator containing at least one such strain wave gear can also be used advantageously with especially good utilization of the design space also at other locations or in other subassemblies of a motor vehicle.

Especially advantageous is a motorized linkage for the connecting of two carriers of a programmable automated movement device able to move relative to each other, which comprises a strain wave gear as claimed in the invention and/or an actuator as claimed in the invention. Such a linkage with high load capacity and performance can advantageously have an especially compact design. In particular, a programmable automated movement device may advantageously have at least one motorized linkage with such a strain wave gear and/or such an actuator.

Especially in regard to a compact design with large loading capability and performance, a programmable automated movement device is most especially advantageous which comprises a strain wave gear as claimed in the invention and/or an actuator as claimed in the invention.

Of special advantage is a programmable automated movement device with two carriers, which are movably connected with respect to each other by means of a motorized linkage according to the invention. In particular, it may be advantageously provided that one of the carriers is connected directly or indirectly in rotationally firm manner to a stator of the driving motor and/or a driving motor housing of the driving motor, while the other of the carriers is coupled in rotationally firm manner to an output element of the strain wave gear.

The two carriers movably connected by means of the motorized linkage may be, for example, part of a robotic arm. In particular, the motorized linkage may have a fixation device, especially one which can be electrically activated, for the arresting of the carriers relative to each other.

In one particular embodiment, the motorized linkage has two housing pieces able to move relative to each other, with the driving motor arranged in one of the housing pieces and the strain wave gear arranged in the other housing piece. Alternatively or additionally, it may also be provided that one piece of the strain wave gear is arranged in one of the housing pieces and another piece of the gearing is arranged in the other housing piece. In particular, one housing piece may be configured and arranged so that it is connected rigidly directly or indirectly to one of the carriers, while the other housing piece is configured and arranged so that it is connected rigidly to the other carrier. It is also alternatively possible for a housing of a first carrier to also additionally function as a first housing piece and/or for a housing of a second carrier to also function additionally as a second housing piece.

In a special embodiment, the motorized linkage is designed so as to connect two carriers such that the plane in which one of the carriers moves and the plane in which the other carrier moves are arranged always parallel to each other. In another embodiment, the linkage is designed so as to connect two carriers such that the plane in which one of the carriers moves and the plane in which the other carrier moves are arranged always perpendicular to each other.

In particular, the linkage can be designed as a hinged linkage.

BRIEF DESCRIPTION OF THE DRAWING VIEWS

The drawing represents the subject of the invention in exemplary and schematic fashion, which shall be described below with the aid of the figures; the same or equivalent elements will usually be provided with the same reference numbers.

In the drawings:

FIG. 1 shows a vehicle steering assembly formed in accordance with an embodiment of the present invention;

FIG. 2 schematically illustrates a strain wave gear having an outer ring, an inner ring, a wave generator, and a ball bearing;

FIG. 3 schematically illustrates a high axis D of the inner ring and a low axis E of the inner ring;

FIG. 4 schematically illustrates a cross section height of the bearing;

FIG. 5 schematically illustrates a profile angle of teeth of toothing of the inner ring;

FIG. 6 schematically illustrates a tooth thickness; and

FIG. 7 schematically illustrates a rim thickness of the inner ring.

DETAILED DESCRIPTION OF THE INVENTION

FIG. 1 shows a sample embodiment of a vehicle steering 1, containing an actuator, designed as a superimposition actuator 3 and having a sample embodiment of a strain wave gear 9 according to the invention. The vehicle steering 1 comprises a steering handle 2, which is in operative connection to the superimposition actuator 3. The superimposition actuator 3 has the function of superimposing additional steering movements onto the steering movements exerted with a steering handle 2. The steering movements exerted by the driver with the steering handle 2 are transmitted, along with the additional steering movements, via a steering gear 4 and via tie rods 5 to the wheels 6 and the wheel steering angle of the wheels 6 is adjusted accordingly.

The superimposition actuator 3 has an input shaft 7, which is mechanically connected to the steering handle 2. The superimposition actuator 3 furthermore has an output shaft 8, which is mechanically coupled to the steering gear 4.

The strain wave gear 9 comprises the output shaft 8, which is rotationally mounted by means of an output bearing 10. The output shaft 8 is firmly connected to an outer ring 11, having an inner toothing 12. The strain wave gear 9 furthermore has an inner ring 13 flexible in the radial direction, having an outer toothing 14. The outer toothing 14 of the flexible inner ring 11 has exactly 160 teeth, while the inner toothing 12 of the outer ring 11 has exactly 162 teeth. The outer toothing 14 of the flexible inner ring 11 engages with the inner toothing 12 of the outer ring 11 at two mutually opposite points.

The ratio of the pitch diameter of the outer ring 11 to the rim thickness of the outer ring 11 lies in the region of 15 to 20. The teeth of the toothing of the inner ring 13 all have the same profile angle, namely, each time a profile angle in the region of 8 degrees to 15 degrees, in particular precisely 11.615 degrees, while the teeth of the toothing of the outer ring 11 each time have a profile angle in the region of 8 degrees to 15 degrees, especially precisely 12.474.

The flexible inner ring 13 is connected in rotationally firm manner to the input shaft 7.

The superimposition actuator 3 furthermore has an electrical superposition drive 15, comprising a stator 17 fastened to a housing 16 and a rotor 19 arranged rotationally firm to a wave generator 18. The housing 16 may be connected in rotationally firm manner to a vehicle chassis.

The wave generator 18 is provided with a wave generator bearing 20, which makes it possible for the wave generator 18 to turn within the inner ring 13, the inner ring 13 being pressed by the wave generator 18 and its wave generator bearing 20 into an oval shape, which revolves upon rotation of the wave generator 18 inside the inner ring 13 so that the outer toothing 14 of the inner ring 13 rolls along the inner toothing 12 of the outer ring 11. The wave generator 18 is connected to a drive shaft 21, fashioned as a hollow shaft, which is mounted rotationally on the housing 16 by means of at least one bearing 22, especially two bearings.

The output shaft 8 is likewise fashioned at least partly as a hollow shaft, in which a centering pin 23 is anchored. The centering pin 23 serves to center the output shaft 8 and the input shaft 7 and support them by means of another bearing 24 so that they can turn relative to each other.

The superimposition actuator 3 has a bearing module 25, comprising a bearing 26 for the rotational mounting of the input shaft 7. Inside the bearing module 25 is provided a rotation angle sensor 27, whose output signals are used to control or regulate the commutation of the electrical superposition drive 15. The rotation angle sensor 27 in an alternative embodiment may be provided not in the bearing module 25, but instead adjacent to the rotor 19 in a region between the rotor 19 and the wave generator 18. This rotation angle sensor 27 is shown by dashed line in FIG. 1.

The commutation of the superposition drive 15 is controlled by an electronics package 30, which receives the output signals of the rotation angle sensor 27. The electronics package 30 may consist of several components, as represented schematically in FIG. 1. Furthermore, the electronics package 30 in an alternative design may be arranged as a path control device outside the superimposition actuator.

The superimposition actuator 3 may be outfitted with a steering angle sensor 28 integrated in the superimposition actuator. Specifically, the steering angle sensor 28 is likewise arranged in the bearing module 25 and designed to continually measure the rotary angle position of the input shaft 7 and send corresponding signals to the electronics package 30. The steering angle sensor 28 in an alternative design may be arranged in the region of the steering handle 2.

The electronics package 30 contains a superposition electronics, which regulates the superposition drive 15 in dependence on signals of the steering angle sensor 28 and in dependence on further parameters in regard to the driving conditions, which the electronics package 30 receives from the outside.

The bearing module 25 has its own housing 29. This forms a cover for the housing 16 of the superimposition actuator 3 and at the same time seals off the housing 16.

LIST OF REFERENCE NUMBERS

1 Vehicle steering
2 Steering handle
3 Superimposition actuator
4 Steering gear
5 Tie rods
6 Wheels
7 Input shaft
8 Output shaft
9 Strain wave gear
10 Output bearing
11 Outer ring
12 Inner toothing
13 Inner ring
14 Outer toothing
15 Superposition drive
16 Housing
17 Stator
18 Wave generator
19 Rotor
20 Wave generator bearing
21 Drive shaft
22 Bearing
23 Centering pin
24 Another bearing
25 Bearing module
26 Bearing for rotational mounting of the input shaft 7
27 Rotation angle sensor
28 Steering angle sensor
29 Housing of the bearing module 25
30 Electronics package
31 Outer ring
32 Inner ring
33 Wave generator
34 Ball bearing
35 Cross section height
36 Profile reference line
37 Pitch circle
38 Tooth base
39 Inner surface of the inner ring

What is claimed is:

1. A strain wave gear, having an outer ring with an inner toothing, with which a flexible inner ring with an outer toothing engages at two opposing points, characterized in that the ratio of the pitch diameter of the outer ring to the rim thickness of the outer ring lies in the region of 15 to 20, and
   a. the teeth of the toothing of the inner ring have a profile angle in the region of 8 degrees to 15 degrees, and/or
   b. the teeth of the toothing of the outer ring have a profile angle in the region of 8 degrees to 15 degrees.

2. The strain wave gear as claimed in claim 1, characterized in that the number of teeth of the outer toothing of the flexible inner ring is between 154 and 166 teeth and the inner toothing of the outer ring has precisely two more teeth than the outer toothing of the flexible inner ring.

3. The strain wave gear as claimed in claim 1, characterized in that the outer ring has a rim thickness in the region of 3 mm to 8 mm.

4. The strain wave gear as claimed in claim 1, characterized in that the outer ring contains iron and/or the outer ring consists of steel.

5. The strain wave gear as claimed in claim 1, characterized in that
   a. the outer toothing and the inner toothing each have a modulus in the region of 0.4 mm to 0.7 mm, and/or
   b. the outer toothing of the inner ring has a pitch diameter in the region of 90 mm to 92 mm, and/or
   c. the inner toothing of the outer ring has a pitch diameter in the region of 91 mm to 93 mm.

6. The strain wave gear as claimed in claim 1, characterized in that the strain wave gear has a deflection in the region of 1.1 mm to 1.3 mm.

7. The strain wave gear as claimed in claim 1, characterized in that the strain wave gear comprises a wave generator, which is mounted rotatably in the inner ring by means of a bearing.

8. The strain wave gear as claimed in claim 7, characterized in that the bearing has a cross section height in the region of 11 mm to 13 mm.

9. The strain wave gear as claimed in claim 7, characterized in that the roller bodies of the bearing have a roller body diameter in the region of 8.5 mm to 8.9 mm.

10. The strain wave gear as claimed in claim 7, characterized in that
    the quantity of the strain wave gear which is computed from (deflection/cross section height) lies in the region of 0.08 to 0.12.

11. The strain wave gear as claimed in claim 7, characterized in that
    the quantity of the strain wave gear which is computed from (deflection/cross section height)×roller body diameter lies in the region of 0.7 to 1.0.

12. The strain wave gear as claimed in claim 1, characterized in that
    the ratio of the deflection and the pitch diameter of the inner ring in the strain wave gear lies in the region of 0.008 to 0.018.

13. The strain wave gear as claimed in claim 1, characterized in that in the strain wave gear
    a. the teeth of the toothing of the inner ring have a tooth thickness in the region of 0.7 mm to 0.9 mm, and/or
    b. the teeth of the toothing of the outer ring have a tooth thickness in the region of 0.8 mm to 1.1 mm.

14. The strain wave gear as claimed in claim 1, characterized in that
    in the strain wave gear the ratio of the deflection to the number of teeth of the inner ring lies in the region of 0.005 to 0.01.

15. The strain wave gear as claimed in claim 1, characterized in that
    the rim thickness of the inner ring lies in the region of 0.9 mm to 1.3 mm.

16. The strain wave gear as claimed in claim 1, characterized in that
    in the strain wave gear the ratio of the deflection to the rim thickness of the inner ring lies in the region of 0.9 to 1.2.

17. The strain wave gear as claimed in claim 1, characterized in that
    in the strain wave gear the ratio of the deflection to the profile angle of the teeth of the inner ring lies in the region of 0.06 to 0.15.

18. The strain wave gear as claimed in claim 1, characterized in that
    in the strain wave gear the ratio of the deflection to the tooth thickness of the teeth of the inner ring lies in the region of 1.1 to 1.9.

19. The strain wave gear as claimed in claim 1, characterized in that
    a. the evolvent portion of the toothing length of the inner ring lies in the region of 15% to 40%, and/or
    b. the evolvent portion of the toothing length of the outer ring lies in the region of 19% to 39%.

20. The strain wave gear as claimed in claim 1, characterized in that the outer toothing of the flexible inner ring has, instead of between 154 and 166 teeth, a number of teeth in the region of 308 to 332 teeth, and the inner toothing of the outer ring has precisely four more teeth than the flexible inner ring.

21. The strain wave gear as claimed in claim 20, characterized in that the outer toothing and the inner toothing each have a modulus in the region of 0.2 mm to 0.35 mm.

22. The strain wave gear as claimed in claim 1, characterized in that the inner ring engages with the outer ring at three points instead of two points and the outer toothing of the flexible inner ring has, instead of between 154 and 166 teeth, a number of teeth in the region of 231 to 249 teeth, and the inner toothing of the outer ring has precisely three more teeth than the outer toothing of the flexible inner ring.

23. The strain wave gear as claimed in claim 22, characterized in that the outer toothing and the inner toothing each have a modulus in the region of 0.27 mm to 0.47 mm.

24. The strain wave gear as claimed in claim 1, characterized in that the inner ring engages with the outer ring at four points instead of two points and the inner toothing of the outer ring has, instead of two, precisely four more teeth than the outer toothing of the flexible inner ring.

25. An actuator with a superposition gear, wherein the superposition gear is a strain wave gear as claimed in claim 1, and with a motor which drives a shaft of the strain wave gear.

26. The actuator as claimed in claim 25, characterized in that the actuator is designed as a superimposition actuator for a vehicle steering, which is designed to superimpose additional steering movements on the steering movements executed with a steering handle.

27. The actuator as claimed in claim 25, characterized in that
    a. more than two coils of the motor are switched to a common motor phase and/or
    b. at least one coil of the motor is wound with at least two wires switched in parallel with each other, and/or
    c. on at least one stator tooth, there are present at least 17 windings, and/or
    d. the coil cross section area in the motor per each coil tooth is greater than 1.4 mm$^2$, and/or
    e. the rotor of the motor has more than 4 pole pairs and/or
    f. the length of the magnets is at least 20 mm and/or
    g. the outer diameter of the rotor lies in the region of 42 mm to 46 mm and/or
    h. the tip circle diameter of the magnets is greater than 40 mm.

28. The actuator as claimed in claim 25, characterized in that a. the motor and the strain wave gear are arranged coaxially to each other and/or
b. the motor and the strain wave gear together form a superimposition actuator and/or
c. the motor and the strain wave gear are arranged in a common housing.

29. The actuator as claimed in claim 25, wherein the actuator is connected to an active chassis for a motor vehicle.

30. A vehicle steering, comprising an actuator as claimed in claim 25 and a steering handle connected to the actuator.

31. The vehicle steering as claimed in claim 30, characterized in that the actuator as a superimposition actuator comprises an input shaft mechanically connected to the steering handle and a drive shaft, arranged coaxially to the input shaft, which is driven by the motor and mechanically connected to a wave generator of the strain wave gear.

32. The vehicle steering as claimed in claim 30, wherein the vehicle steering is part of a motor vehicle.

33. The strain wave gear according to claim 1, wherein the strain wave gear is part of a motorized linkage for the connecting of two carriers of a programmable automated movement device able to move relative to each other.

34. The actuator according to claim 25, wherein the actuator is part of a motorized linkage for the connecting of two carriers of a programmable automated movement device able to move relative to each other.

* * * * *